United States Patent
Loesch

(10) Patent No.: US 12,249,191 B2
(45) Date of Patent: Mar. 11, 2025

(54) METHOD FOR DETERMINING THE OPERATING STATE OF VEHICLE COMPONENTS

(71) Applicant: Robert Bosch GmbH, Stuttgart (DE)

(72) Inventor: Felix Loesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 17/652,903

(22) Filed: Feb. 28, 2022

(65) Prior Publication Data

US 2022/0284740 A1  Sep. 8, 2022

(30) Foreign Application Priority Data

Mar. 5, 2021 (DE) ...................... 10 2021 202 177.8

(51) Int. Cl.
  *G07C 5/00* (2006.01)
  *G06N 5/02* (2023.01)
  *G07C 5/08* (2006.01)

(52) U.S. Cl.
  CPC ............... *G07C 5/006* (2013.01); *G06N 5/02* (2013.01); *G07C 5/008* (2013.01); *G07C 5/0808* (2013.01); *G07C 5/0816* (2013.01)

(58) Field of Classification Search
  None
  See application file for complete search history.

(56) References Cited

U.S. PATENT DOCUMENTS

| 2006/0149441 A1* | 7/2006 | Takamura | G01K 15/00 701/29.2 |
| 2008/0195273 A1* | 8/2008 | Matsuura | B60R 25/04 701/29.2 |
| 2022/0242426 A1* | 8/2022 | Kurokawa | B60W 50/0225 |

FOREIGN PATENT DOCUMENTS

| CN | 111414477 A |   | 7/2020 |          |
| CN | 111414477 B | * | 2/2024 | G01M 17/00 |

* cited by examiner

*Primary Examiner* — Peter D Nolan
*Assistant Examiner* — Jacob Kent Besteman-Street
(74) *Attorney, Agent, or Firm* — Norton Rose Fulbright US LLP

(57) ABSTRACT

A method for determining an operating state of a vehicle component of a vehicle. The method includes providing a first knowledge graph that contains information concerning a plurality of vehicle components of a vehicle, each vehicle component providing one or more signals. The method includes determining the operating state of a vehicle component from the plurality of vehicle components, the determining including selecting, using the first knowledge graph, a plurality of signals and one or more state parameters that are necessary for determining the operating state of the vehicle component. The determining further includes calculating one or more state parameters of the vehicle component, based on the selected plurality of signals. The determining of the operating state of the vehicle component includes ascertaining the operating state of the vehicle component based on the information contained in the first knowledge graph and based on the calculated one or more state parameters.

21 Claims, 3 Drawing Sheets

METHOD FOR DETERMINING THE OPERATING STATE OF VEHICLE COMPONENTS

CROSS REFERENCE

The present application claims the benefit under 35 U.S.C. § 119 of German Patent Application No. DE 10 2021 202 177.8 filed on Mar. 5, 2021, which is expressly incorporated herein by reference in its entirety.

FIELD

The present invention relates to techniques for determining an operating state of a vehicle component of a vehicle. Associated aspects relate to an electronic vehicle system and a data cloud system.

BACKGROUND INFORMATION

A typical problem in proactively checking the operating state of vehicle components is the limited amount of diagnostic information that is available to the supplier, the original equipment manufacturer (OEM), the vehicle owner, or the repair shop. In some methods according to the related art, data from vehicle signals are generally available only in the vehicle, and possibly may not be stored for further analysis due to the limited memory capacity in the electronic vehicle control devices. Therefore, when vehicle components fail or malfunction, in methods of the related art often only high-level diagnostic trouble codes (DTCs) are generated and locally stored in the error protocol. These diagnostic trouble codes may be of limited informative value with regard to the root of a problem in question. In addition, due to the stated limitations, the vehicle diagnosis is generally not carried out until some time after a problem arises, in a repair shop (where the DTC code may be read out). In many cases, considerable effort and additional expert knowledge are necessary to identify the cause of the problem. As a result, vehicle components may be replaced during vehicle repairs without knowing which vehicle component has actually caused a problem, and for what reason. Furthermore, in many cases it is not possible to detect a problem before major damage to the vehicle components has occurred.

SUMMARY

A first general aspect of the present invention relates to a method for determining an operating state of a vehicle component of a vehicle. In accordance with an example embodiment of the present invention, the method includes providing a first knowledge graph that contains information concerning a plurality of vehicle components of a vehicle, each vehicle component providing one or more signals. The method also includes determining the operating state of a vehicle component from the plurality of vehicle components, the determining including selecting, using the first knowledge graph, a plurality of signals and one or more state parameters that are necessary for determining the operating state of the vehicle component. The determining also includes calculating one or more state parameters of the vehicle component, based on the selected plurality of signals. Lastly, the determining of the operating state of the vehicle component includes ascertaining the operating state of the vehicle component based on the information contained in the first knowledge graph and based on the calculated one or more state parameters.

A second general aspect of the present invention relates to an electronic vehicle system. In accordance with an example embodiment of the present invention, the electronic vehicle system includes a first electronic device and a second electronic device, which is designed to carry out the method according to the first general aspect of the present invention. The system includes the first electronic device for using the first knowledge graph. The second electronic device is configured to monitor and receive the signals from a plurality of vehicle components of the vehicle. Furthermore, the second electronic device is configured to ascertain the state parameters of the plurality of vehicle components.

A third general aspect of the present invention relates to a data cloud system. In accordance with an example embodiment of the present invention, the data cloud system is designed to receive information from the second device according to the second general aspect, and to carry out the method according to the first general aspect of the present invention in order to update a conceptual model of the second knowledge graph. In addition, the data cloud system is configured to transmit a piece of update information, contained in the updated conceptual model of the second knowledge graph, to the second device of each vehicle from the plurality of vehicles.

The techniques of the first through third general aspects may have one or more of the following advantages.

First, the techniques of the present invention offer the option of providing expert knowledge concerning vehicle components, their potential problems/malfunctions, and relevant vehicle signal data that are necessary for calculating state parameters, in an accessible, retrievable form during operation of the vehicle, using a vehicle knowledge graph. Thus, compared to some techniques of the related art, this may enable a detailed vehicle diagnosis of vehicle components during operation, which in comparison to on-board diagnostics (OBD), conventional in the related art, may provide improved insights into an operating state of a vehicle component.

Second, the present techniques may contribute toward effectively reducing the effort for diagnosing vehicle components, in that an operating state is proactively provided and controlled for each vehicle component. In the event of deterioration of the operating state, the vehicle may proactively notify a user of the vehicle or a third party (for example, via a data cloud system (cloud computing system)). Thus, for example, a problem may be detected more quickly and time and effort may be saved in a diagnosis in a repair shop, since it is no longer necessary to wait until some time after the problem has arisen to carry out a diagnosis on the basis of limited information. In addition, the present techniques may provide an overview of all relevant data concerning the state of health of the vehicle components before the vehicle actually arrives at the repair shop.

Third, the techniques of the present invention may allow analysis of the operating state of vehicle components using the data cloud vehicle knowledge graph, which stores operating states and other relevant vehicle data for multiple vehicles (for example, concerning a model or with certain components). In particular, the present techniques include statistical analysis and training of the data cloud vehicle knowledge graph via a fleet of vehicles (for example, more than 1000 or more than 10,000 vehicles), so that the knowledge graph may be continually improved (for example, which state parameters are needed for assessing the operating state of vehicle components). In many methods of the related art, these data are neither available nor analyzed, since the vehicles do not transmit operating state data for each vehicle component, and also these and other relevant data are not compiled in a data cloud vehicle knowledge graph.

Several terms are used in the present disclosure in the following way:

The term "vehicle" encompasses any device that is designed for transporting passengers and/or cargo. The vehicle may be a motor vehicle (for example, an at least semi-autonomously operating/assisted motor vehicle, in particular a passenger vehicle or a truck). However, the vehicle may also be a ship, a train, an aircraft, or a spacecraft.

The term "vehicle component" is understood to mean any internal component of a vehicle. A vehicle component may be a motor (for example, an internal combustion engine, an electric motor, a hybrid engine, or a fuel cell, or portions of an engine such as a turbocharger), a control device (an engine control unit, for example), a battery or other energy-consuming systems, components of a drive train (a transmission, for example), assistance systems (braking assistants lane-keeping assistants, parking assistants, for example), air conditioning systems, sensors or sensor systems (camera-based systems, lidar systems, radar systems, ultrasonic sensor systems, for example), or electronic systems for controlling functions of the vehicle interior. A vehicle component may also be a part of the systems described above or a combination of multiple of the systems described above (or portions thereof).

Accordingly, the term "vehicle parameter" encompasses various parameters that may play a role in determining an operating state of a vehicle component; i.e., they may characterize the operating state of one or more vehicle components. A nonexhaustive list of such parameters includes a temperature (internal or external temperature, for example), a pressure (an air pressure, for example), a rotational speed, a torque, a mass flow, a wear parameter, a friction parameter, a current intensity, a voltage, a power level, an efficiency, a pressure ratio, a speed, an acceleration, etc.

The term "signals" may encompass all signals that are detected for the vehicle during operation of the vehicle or that have been detected in the past. These involve the signals of vehicle components of the vehicle that are generated, for example, using appropriate sensors with which the vehicle components are equipped or which are situated in the vicinity of the particular vehicle components.

The term "knowledge graph" in the following discussion refers to all approaches that describe data points (for example, data that map respective signals of vehicle components) on a semantic level, i.e., approaches in which the data points themselves are transmitted in semantic models in order to make them usable. The data points may be interpreted as data instances of concepts, which in a conceptual model are defined among one another using appropriate relationships. In addition, attributes may be associated with the concepts. A knowledge graph is made up of its conceptual model and the data instances of the concepts defined in the conceptual model. Further explanations are provided below.

The term "data cloud system" or cloud computing system is an infrastructure that is made available via a network, for example via the Internet. A data cloud system generally includes memory space, computing power, and/or application software as a service (i.e., a user may utilize these resources via the network). In other words, a data cloud system is an infrastructure that is made available via a network without it having to be present/installed on the local system. Data cloud systems may contain distributed resources (for example, of multiple computer systems at various locations). The resources of the data cloud system are offered and utilized via technical interfaces and protocols, for example by use of a web browser.

DETAILED DESCRIPTION OF EXAMPLE EMBODIMENTS

First, the techniques for determining an operating state of a vehicle component of a vehicle are described with reference to FIG. 1. An example of a structure of first knowledge graph 10 is then discussed with reference to FIG. 2. Lastly, possible embodiments and further aspects of the present invention are described with reference to FIG. 3.

Figure 1:
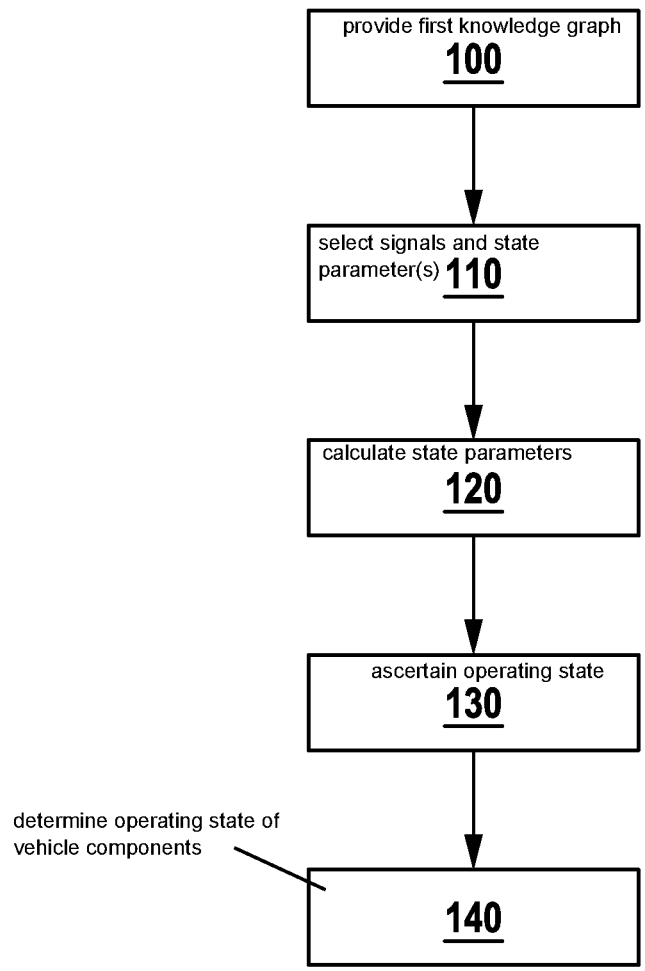
FIG. 1 schematically shows an example of a method 140 for determining an operating state of a vehicle component of a vehicle, based on first knowledge graph 10, in accordance with the present invention.

As illustrated in in FIG. 1, a first general aspect relates to a method 140 for determining an operating state of a vehicle component of a vehicle. The method includes providing 100 a first knowledge graph 10 that contains information concerning a plurality of vehicle components Comp A, Comp B of a vehicle FA (also see FIG. 2). The term "first knowledge graph" does not mean that there is necessarily also a second knowledge graph. The term is used only for differentiating the knowledge graph in cases in which multiple knowledge graphs are used. First knowledge graph 10 may, for example, be a local vehicle knowledge graph that is implemented on a unit of a vehicle diagnostic system or some other unit of the vehicle (i.e., that is stored in the vehicle). In other examples, knowledge graph 10 may be stored on a remote system (i.e., outside the vehicle) and connected to the vehicle via suitable communication interfaces (described in greater detail below).

Figure 2:
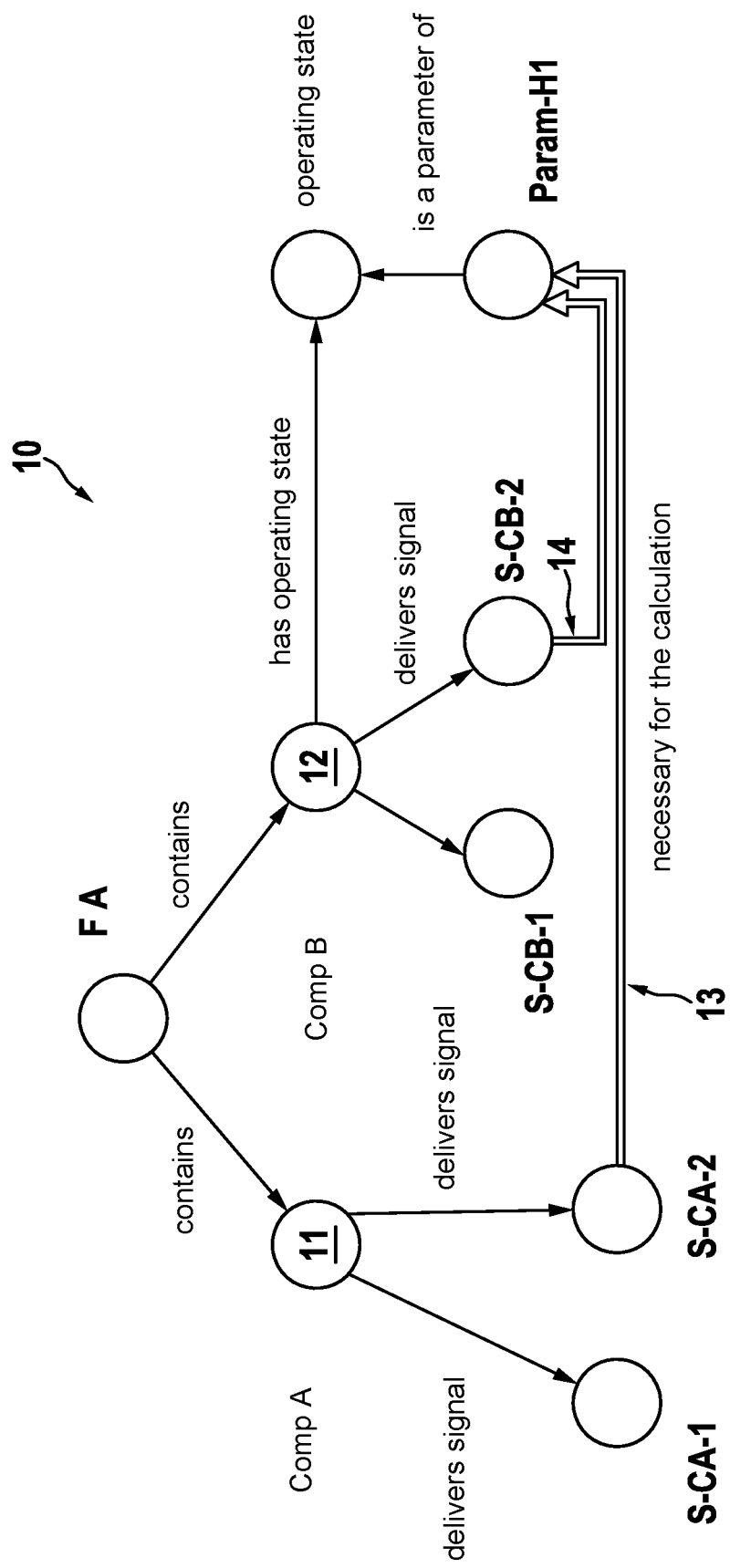
FIG. 2 schematically shows an example structure of a first knowledge graph 10 of a vehicle in accordance with the present invention, including two vehicle components Comp A, Comp B which in each case generate two signals S-CA-1, S-CA-2 and S-CB-1, S-CB-2, respectively. Parameter Param-H1 is calculated from the two signals S-CA-2 and S-CB-2, and this parameter is further used to determine the operating state of vehicle component Comp B.

As mentioned above, the knowledge graph may contain concepts, attributes, and relationships between the particular concepts, for example each concept mapping a vehicle component (modeling the vehicle component). Therefore, in some examples the first knowledge graph may be used to calculate state parameters and/or to ascertain an operating state of a vehicle component. In addition, for example each of the vehicle components may provide one or more signals S-CA-1, S-CA-2, S-CB-1, S-CB-2. In some examples, as mentioned above, these signals may be generated by corresponding sensors. The example in FIG. 2 schematically illustrates a structure of first knowledge graph 10 of the vehicle, including two vehicle components Comp A, Comp B (for purposes of illustration, the structure is greatly simplified compared to many "realistic cases"). In this example, the two components in each case generate two signals S-CA-1, S-CA-2 and S-CB-1, S-CB-2, respectively. In other examples, the vehicle may contain more vehicle components (for example, more than 10 or more than 100 vehicle components) that are mapped in a knowledge graph. Each of these components may in turn generate one or more signals (for example, more than 5 or more than 10 signals). Therefore, FIG. 2 illustrates only a simplified structure of first knowledge graph 10, or the structure shown in FIG. 2 may in some examples represent only a substructure of the first knowledge graph.

The techniques of the present present further include determining 140 the operating state of a vehicle component Comp B from the plurality of vehicle components Comp A, Comp B. The determining may include selecting 110, using first knowledge graph 10, a plurality of signals and one or more state parameters Param-H1 that are necessary for determining the operating state of the vehicle component. In other words, the first knowledge graph may be queried as to which signals and which state parameters may be relevant for determining the operating state of the vehicle component (for example, the vehicle component in question at a certain point in time during operation of vehicle FA). In the example in FIG. 2, two signals, namely, second signal S-CA-2 of first vehicle component Comp A and second signal S-CB-2 of second vehicle component Comp B, as well as a single state parameter Param-H1 are necessary for determining the operating state of second vehicle component Comp B. A single parameter Param-H1 is shown in FIG. 2 only as an example, and in other cases multiple state parameters may be necessary for determining the operating state of the vehicle component (for example, more than 5 or more than 10 state parameters). Alternatively or additionally, only one signal or more than two signals may be necessary for determining the operating state of the vehicle component.

Furthermore, the step of determining in the method may include calculating 120 one or more state parameters Param-H1 of the vehicle component based on the selected plurality of signals. The state parameters may be calculated using a vehicle diagnostic system, for example. In some examples, one or more signals of the vehicle component may be necessary in order to calculate the state parameter of the same vehicle component. In other examples, one or more signals of a first vehicle component may be necessary in order to calculate the state parameter of a second vehicle component. In this regard, FIG. 2 shows above-mentioned second signals S-CA-2 and S-CB-2 of the two vehicle components that are used to calculate single state parameter Param-H1. In the other examples, the state parameter may be a function of multiple signals (for example, more than 5 or more than 10 signals), which are therefore used for calculating the state parameter.

Lastly, the operating state of the vehicle component may be calculated based on the information contained in first knowledge graph 10 and based on calculated one or more state parameters Param-H1. For example, the calculation of the operating state may be carried out by the vehicle diagnostic system. In this context, the information contained in the first knowledge graph may contain information concerning a relationship between two or more vehicle components Comp A, Comp B from the plurality of vehicle components of the vehicle. For example, this relationship may be based on a relationship between one or more signals S-CA-2 and S-CB-2 and state parameters Param-H1 that are used for determining the operating state of the vehicle component. In some examples, such a method of the present invention may be used to determine the operating state of the two or more vehicle components of the vehicle. In the other examples, this method may be used to determine the operating state of a larger or smaller number of vehicle components of the vehicle.

As mentioned above, the first knowledge graph in the present techniques may include a conceptual model with a plurality of concepts. In one example, each concept may map a corresponding vehicle component from the plurality of vehicle components. In addition, the concepts may be provided with attributes, and their particular relationships with one another may be defined. A concept may be regarded as nodes 11, 12 of knowledge graph 10, and a relationship between the concepts may be regarded as edges 13, 14 that connect the concepts (or nodes) to one another. The plurality of concepts may, for example, map a vehicle together with all vehicle components, or a portion thereof. The relationship between the concepts may be such that, for example, a signal of the first component is necessary to calculate the state parameter of the second vehicle component, or conversely, a signal of the second component is necessary to calculate the state parameter of the first vehicle component. In other examples, the relationship between the concepts may indicate that the same state parameter is queried by the two or more vehicle components. In some examples, the first knowledge graph may include a plurality of data instances. These data instances may include data points from the one or more signals. Additionally or alternatively, data instances may also contain data points from the one or more state parameters of each vehicle component. In addition, the data instances may be associated with the respective concepts in the conceptual model. Furthermore, the first knowledge graph may be configured to receive the one or more signals and the one or more state parameters of each vehicle component, and may be further designed to transfer received signals and state parameters into the conceptual model. Additionally or alternatively, the first knowledge graph may also be designed in such a way that it tranfers the received signals and state parameters into the data instances. In some examples, receiving the one or more signals may include generating the data points (for example, time series of data points) from the one or more signals. Additionally or alternatively, the data points (for example, time series of data points) may be generated from the one or more state parameters. In some examples, the data points may be generated by the vehicle diagnostic system or some other unit of the vehicle after appropriate processing of the signals (for example, the signals detected by sensors).

Figure 3:
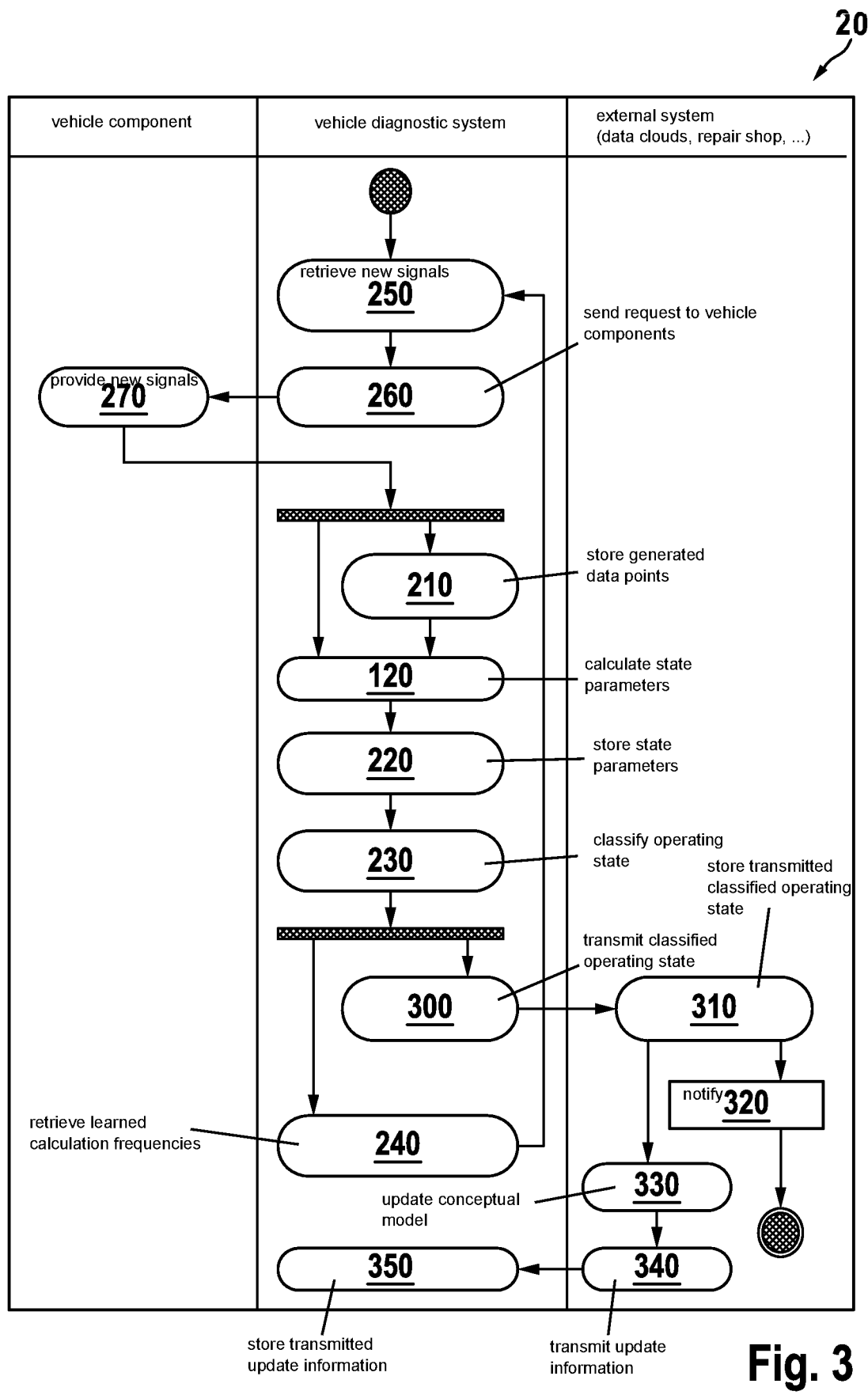
FIG. 3 schematically shows possible embodiments and further aspects 20 of a method for determining an operating state of a vehicle component of a vehicle in accordance with the present invention.

The next step of the example of the method according to FIG. 3 includes storing 210 the generated data points, provided with a corresponding time stamp (for example, the time series of the generated data points), from the one or more signals of the vehicle component in first knowledge graph 10. In some examples, the data points may be stored as the data instances in the first knowledge graph.

In some examples of the present techniques, the state parameter of the vehicle component may be continuously calculated 120 (by the vehicle diagnostic system, for example), using the first knowledge graph (for example, more than once per day or more than once per hour during operation of the vehicle). In the other examples, the state parameter of the vehicle component is calculated at predefined points in time, using the first knowledge graph. Furthermore, each state parameter of the vehicle component may be stored 220 (as the data instance, for example) in the first knowledge graph. Each state parameter may be provided with a corresponding time stamp.

In some examples, the calculation of the operating state of the vehicle component may take place based on one or more current values of the one or more state parameters. In other examples, the operating state of the vehicle component may be calculated based on one or more values, stored in the first knowledge graph, of the one or more state parameters of the vehicle component and/or values of the signals stored in the first knowledge graph. In other words, the knowledge graph may also use historical values of the state parameters and/or signals, which are taken into account for calculating the operating state of the vehicle component. In some examples, the calculation of the state parameters at certain points in time may be carried out on an event-triggered basis. In other examples, the calculation of the state parameters is carried out periodically at certain points in time that are specified by a calculation frequency. For example, the calculation frequency may be provided by the first knowledge graph. In one preferred example, the calculation frequency may be determined for each state parameter of the plurality of vehicle components, based on the first knowledge graph. In some examples, a calculation frequency of a first state parameter may differ from a calculation frequency of a second state parameter. For example, this may be the first state parameter and the second state parameter of the same vehicle component. In another example, the first and second state parameters may be associated with the various vehicle components. In some examples, the calculation frequencies may be the same for two or more state parameters.

In the present invention, determining the operating state may be carried out for each vehicle component from the plurality of vehicle components. A plurality of operating states is thus formed. In some examples, an operating state of the vehicle may be determined based on the plurality of operating states. In addition, determining the operating state of the vehicle component may involve classifying 230 the operating state of the vehicle component (or of the vehicle). In some examples, the operating state may be classified as abnormal with a malfunction or as normal without the malfunction, based on the calculated operating state of the vehicle component. In some examples, the presence of a malfunction may mean that the operating state of the vehicle component has recently deteriorated in a predetermined manner, and/or that the service life of the vehicle component is coming to an end (for example, due to wear of the vehicle component such as a braking system, for example). In other examples, the classifying may include additional and/or other classes. In some examples, there may be two or more error classes which indicate the various types of malfunctions and/or various degrees of severity of malfunctions. Additionally or alternatively, there may be one or more classes that indicate an operating state that is still normal, but that is moving in the direction of a malfunction (i.e., one or more classes that predict an occurrence of a malfunction). In addition to a classification, the operating state may also be determined by a regression of the information contained in the first knowledge graph and based on the calculated one or more state parameters.

In this context, in some examples a deviation between the one or more current values of the one or more state parameters of the vehicle component and the one or more respective values of the one or more state parameters of the vehicle component stored in the first knowledge graph may be calculated. For example, the operating state of the vehicle component may be classified as abnormal with the malfunction when the deviation exceeds a predefined value. Otherwise, the operating state of the vehicle component may be classified as normal without the malfunction. In other examples, one or more corresponding threshold values may be associated with one or more state parameters of the vehicle component in order to determine whether the operating state of the vehicle component is normal or abnormal (or whether some other class of malfunctions is present). For example, a corresponding threshold value may be associated with each state parameter of the vehicle component. The operating state of the vehicle component may then be classified as abnormal with a malfunction (or in some other class of malfunctions) when one or more state parameters of the vehicle component exceed the one or more corresponding threshold values. Otherwise, the operating state of the vehicle component may be classified as normal without the malfunction. In other examples, this criterion may be conversely applied, and may include classifying the operating state of the vehicle component as abnormal when one or more state parameters of the vehicle component fall below the one or more corresponding threshold values, and otherwise classifying the operating state of the vehicle component as normal. In yet other examples, calculating the operating state of the vehicle component may include calculating an average operating state parameter of the vehicle component, which is a function of a weighted sum of all operating state parameters of the vehicle component. In this regard, a corresponding weight may be associated with each operating state parameter of the vehicle component. In one preferred example, the weights associated with the operating state parameters are ascertained using the first knowledge graph.

In some examples, an average threshold value may be associated with the average operating state parameter. In addition, for example the operating state of the vehicle component may be classified as abnormal with a malfunction when the average operating state parameter of the vehicle component exceeds the average threshold value, and otherwise the operating state of the vehicle component may be classified as normal without the malfunction. In other examples, this criterion may be conversely applied, and may include classifying the operating state of the vehicle component as abnormal when the average operating state parameter of the vehicle component falls below the average threshold value, and otherwise classifying the operating state of the vehicle component as normal.

In the present invention, for each operating state parameter the first knowledge graph may contain an operating state indicator of the abnormal operating state of the vehicle component (defined, for example, as an additional property in the knowledge graph), as the result of which a plurality of operating state indicators is formed. In some examples, each operating state indicator may contain the deviation and the predefined value that correspond to the respective state parameter Param-H1 of the vehicle component. In other examples, each operating state indicator may include the threshold value that corresponds to the respective state parameter of the vehicle component. In yet other examples, each operating state indicator may contain the average threshold value and associated weights that correspond to the respective state parameter of the vehicle component.

In the techniques of the present invention, the abnormal operating state of the vehicle component together with respective operating state parameters may be stored in the first knowledge graph. In some examples, the abnormal operating state of the vehicle component may also be provided with a time stamp. In addition, a response may be triggered based on the classified operating state of the one or more vehicle components. In some examples, the response may involve displaying the operating state on a graphical user interface. Additionally or alternatively, the triggered response may include providing information concerning the operating state of the one or more vehicle components to a remote system (for example, to inform the original equipment manufacturer or an automotive repair shop) or to a unit of the vehicle (for example, to inform the driver). In other examples, information concerning the operating state may be displayed on a mobile device of a user of the vehicle. For example, the response may include generating an alarm or warning message based on the classified operating state of the vehicle component as abnormal with the malfunction. Additionally or alternatively, in this case the operation of the vehicle may be stopped or altered. Furthermore, an event protocol file may be generated as a response to the classified abnormal operating state of the vehicle component. In some examples, a communication may also be transmitted to the remote system. The response may include, for example, the communication that the vehicle needs maintenance or repairs if the classified operating state is abnormal. Conversely, if the operating state has been classified as normal, the response may include the communication that the vehicle is functioning normally. In other examples, the responses described above may also be carried out in response to ascertaining other malfunctions mentioned above.

The techniques of the present invention may also include updating, using the first knowledge graph, one or more values of calculation frequencies in response to classifying the operating state of the vehicle component as abnormal with the malfunction. In some examples, the updating, using the first knowledge graph, may include the first knowledge graph learning the one or more values of calculation frequencies. In some examples, such learning may be based on the data instances stored in the first knowledge graph. For example, the updating may include the first knowledge graph learning the one and or more values of calculation frequencies, based on one or more values of state parameters of the vehicle component stored in the first knowledge graph. In some examples, the stored values of state parameters may be used for which the operating state of the vehicle component has been classified as abnormal with the malfunction. Additionally or alternatively, a new plurality of signals of the plurality of vehicle components, which are necessary for determining the operating state of the vehicle component, may also be determined using the first knowledge graph, in response to classifying the operating state of the vehicle component as abnormal with the malfunction. In some examples, the number of signals in the new plurality of signals, which are necessary for determining the operating state of the vehicle component, may differ from the number of signals of the plurality of signals in response to classifying the operating state of the vehicle component as abnormal with the malfunction.

In a next step of the method, the one or more learned calculation frequencies may be retrieved 240 from the first knowledge graph. In addition, the operating state of the one or more vehicle components from the plurality of vehicle components may be determined at a next point in time, according to the respective retrieved one or more calculation frequencies from the first knowledge graph. In some examples, determining the operating state at the next point in time may include retrieving the data instances stored in the first knowledge graph. In other examples, determining the operating state at the next point in time may alternatively or additionally include retrieving the one or more values of state parameters stored in the first knowledge graph. In yet other examples, determining the operating state at the next point in time may include retrieving 250 the new plurality of signals that are necessary for determining the operating state of the vehicle component. Furthermore, determining the operating state at the next point in time may include the first knowledge graph sending a request 260 to the plurality of vehicle components in order to obtain the new plurality of signals. This may provide 270 the new plurality of signals that are obtained from the plurality of vehicle components, and that are necessary for determining the operating state of the vehicle component at the next point in time.

The techniques of the present invention include transmitting 300 the classified operating state of the vehicle component (for example, abnormal with the malfunction) and/or the respective one or more state parameters that resulted in the operating state of the vehicle component being correspondingly determined (for example, as abnormal with the malfunction), to a remote system. In some examples, the classified operating state of the vehicle component (for example, abnormal with the malfunction) and/or the particular one or more state parameters may be transmitted to a second knowledge graph. In some examples, the second knowledge graph may be stored in a data cloud system (or some other computer system remote from the vehicle). Therefore, the second knowledge graph may also be referred to as a data cloud vehicle knowledge graph. In some examples, the method may include transmitting 300 the classified operating state of a plurality of the or each vehicle component (for example, as abnormal with a malfunction) and/or the respective one or more state parameters that resulted in the operating state of the corresponding vehicle component being correspondingly determined (for example, as abnormal with the malfunction), to the second knowledge graph. In some examples, the particular one or more state parameters may be transmitted together with the corresponding one or more operating state indicators. Additionally or alternatively, these state parameters may also be transmitted together with the corresponding plurality of signals. Furthermore, transmitting the data instances stored in the first knowledge graph may include transmitting to the second knowledge graph.

The next step may include storing 310 the transmitted classified operating state and/or the one or more state parameters of the one or more vehicle components of the vehicle and/or the signals, in some cases together with the corresponding one or more operating state indicators, in the second knowledge graph as data instances. Additionally or alternatively, the state parameters may also be stored together with the corresponding plurality of signals in the second knowledge graph as data instances. Furthermore, the method may include notifying 320 an operator (for example, an employee of the original equipment manufacturer or at an automotive repair shop) or vehicle driver (via the data cloud system, for example) when the operating state of the one or more vehicle components of the vehicle indicates a malfunction. In some examples, the notification may also contain information concerning the corresponding one or more state parameters, for example together with the corresponding one or more operating state indicators. In one example, the second knowledge graph may include the classified operating states and/or one or more state parameters and/or the signals of the vehicle components of a plurality of vehicles. In this way, the second knowledge graph may collect a large quantity of "missing data" of various types concerning the fleet of vehicles. For example, such a fleet of vehicles may include 10 or more, 100 or more, or 1000 or more vehicles. The vehicles may have certain common features. In some cases, the vehicles may be vehicles of a certain type or model. Alternatively or additionally, the vehicles may include one or more vehicle components of the same type.

In the next step, a conceptual model of the second knowledge graph may be updated based on the transmitted information (operating states, state parameters, and/or signals, for example) of the vehicle components of the plurality of vehicles. In some examples, the updating of the conceptual model of the second knowledge graph may involve using 330 a statistical analysis with regard to the transmitted information (operating states, state parameters, and/or signals, for example) of the vehicle components of the plurality of vehicles in order to optimize the determining of the operating states of the vehicle components. For example, the conceptual model of the second knowledge graph may be updated based on the data instances stored in the second knowledge graph. In this exemplary embodiment, the updating of the conceptual model of the second knowledge graph may involve using a statistical analysis with regard to the data instances stored in the second knowledge graph in order to optimize the determining of the operating states of the vehicle components. In some examples, the use of the statistical analysis may include learning the one or more operating state indicators for the corresponding operating state parameter. This may be aimed at, for example, updating the values of deviations and predefined values contained in the operating state indicators. Alternatively or additionally, in this way the threshold values and/or the average threshold values may also be updated with the associated weights in the operating state indicators of the operating state parameters.

In the next step, the present techniques may include determining one or more new state parameters that are necessary for determining the operating state of the vehicle component, based on the updated conceptual model. Additionally or alternatively, a new plurality of signals that are necessary for determining the operating state of the vehicle component may also be determined. In some examples, a new calculation frequency may be determined for the one or more state parameters of the plurality of vehicle components, based on the updated conceptual model. Furthermore, the conceptual model of the first knowledge graph from the plurality of vehicles may be updated based on the updated conceptual model of the second knowledge graph. For example, the present invention may include transmitting 340 update information (via the data cloud system, for example), contained in the updated conceptual model of the second knowledge graph, to the first knowledge graph of each vehicle from the plurality of vehicles. Lastly, in some examples the transmitted update information may be stored 350 in the first knowledge graph of each vehicle.

A second general aspect of the present invention relates to an electronic system that includes a first electronic device and a second electronic device and is designed to carry out the method according to the first general aspect of the present invention. The first electronic device may be an electronic device of a vehicle (for example, a unit of a vehicle diagnostic system or some other separate unit of the vehicle) for using the first knowledge graph. The second electronic device (the vehicle diagnostic system, for example) may be used for monitoring and receiving signals of a plurality of vehicle components of the vehicle, and for calculating the state parameters of the plurality of vehicle components. The system may include at least one processor, at least one memory (that may contain programs which, when executed, carry out the methods of the present invention), and at least one interface for inputs and outputs.

In the above examples, a local first knowledge graph (i.e., stored in the vehicle) and its use have sometimes been described. In other examples, the first knowledge graph may be stored on a remote system. For example, the vehicle may transmit the plurality of signals to the remote system (for example, periodically or on request). The steps of ascertaining the operating state of the vehicle component of the present invention may then be carried out on the remote system. The remote system may transmit the ascertained operating state back to the vehicle and/or to a third location (for example, to trigger one of the responses described above). In other cases, the first knowledge graph may be stored on a remote system and may cooperate with a unit in the vehicle in order to ascertain the operating state of the vehicle component.

In yet other examples, a knowledge graph that is stored on a remote system may contain information from a plurality of vehicles (described above with regard to the second knowledge graph) and carry out the steps of ascertaining the operating state of the vehicle component of the present invention.

A third general aspect of the present invention relates to a data cloud system that is designed to receive information from the second device according to the second general aspect, and to carry out the method according to the first general aspect of the present invention in order to update a conceptual model of the second knowledge graph. In addition, the data cloud system may be configured to transmit a piece of update information, contained in the updated conceptual model of the second knowledge graph, to the second device of each vehicle from the plurality of vehicles. In some examples, in this regard two or more data cloud systems may also be used.

The present invention further relates to computer programs that carry out the methods of the present invention. The present invention further relates to computer-readable media and signals that are stored or encoded by the computer programs of the present invention.

What is claimed is:

1. A method for a vehicle, the method including the following steps:
   generating signals by a plurality of vehicle components of the vehicle during operation of the vehicle and the vehicle components, wherein a first knowledge graph contains information concerning the plurality of vehicle components of the vehicle; and
   determining an operating state of a vehicle component from the plurality of vehicle components, the determining including the following steps:
   selecting, using the first knowledge graph, a plurality of signals from the signals provided by the vehicle components and selecting one or more state parameters that are necessary for determining the operating state of the vehicle component;
   for each respective one of the one of more state parameters that have been selected, calculating a respective value of the respective state parameter based on the selected plurality of signals; and
   ascertaining the operating state of the vehicle component based on the calculated values of the one or more state parameters;
   wherein the method includes at least one of the following features (I)-(II);
   (I) the knowledge graph:
      (i) includes: (a) a conceptual model that includes (1) a plurality of concepts, each of the concepts mapping a corresponding one of the vehicle components from the plurality of vehicle components, (2) attributes provided for the concepts, and (3) definitions of relationships of the plurality of concepts with one another; and (b) a plurality of data instances that include data points from the plurality of signals and/or from the respective values of the one or more state parameters, and that are associated with the respective concepts in the conceptual model; and (ii) is configured to receive the selected signals and the values of the selected state parameters, and to transfer the received signals and the received state parameters into the conceptual model and/or into the data instances, thereby generating the data points of the plurality of data instances of the knowledge graph; and (II) the method further includes classifying whether the operating state of the vehicle component is abnormal with a malfunction or is normal without the malfunction, based on the ascertained operating state of the vehicle component, and the method further includes at least one of the following features (i)-(iii):

(i) (a) the classifying includes calculating a deviation between the calculated values of the selected one or more state parameters and values of the selected one or more state parameters previously stored in the first knowledge graph, and (b) for each of the state parameters, the first knowledge graph contains an operating state indicator of the abnormal operating state of the vehicle component, as the result of which a plurality of operating state indicators is formed;

(ii) (a) the calculating of the values of the selected one or more state parameters is performed at certain points in time that are specified by a calculation frequency provided by the first knowledge graph and (b) the method further comprises updating, using the first knowledge graph, one or more values of the calculation frequency in response to a classification result obtained from the classifying of the operating state of the vehicle component; and (iii) the method further comprises transmitting the classified operating state of the vehicle component and a respective one or more of the values of the state parameters that resulted in the operating state of the vehicle component being determined as abnormal with the malfunction, to a second knowledge graph.

2. The method as recited in claim 1, wherein the first knowledge graph includes:

(a) the conceptual model that includes (1) the plurality of concepts, each of the concepts mapping the corresponding one of the vehicle components from the plurality of vehicle components, (2) the attributes provided for the concepts, and (3) the definitions of the relationships of the plurality of concepts with one another; and (b) the plurality of data instances that include data points from the plurality of signals and/or from the respective values of the one or more state parameters, and that are associated with the respective concepts in the conceptual model.

3. The method as recited in claim 2, wherein the knowledge graph is configured to receive the selected signals and the values of the selected state parameters, and to transfer the received signals and the received state parameters into the conceptual model and/or into the data instances, thereby generating the data points of the plurality of data instances of the knowledge graph.

4. The method as recited in claim 3, wherein the generating of the data points includes generating a time series of the data points.

5. The method as recited in claim 1, wherein the calculating of the values of the state parameters is performed continuously or at a plurality of predefined points in time, using the first knowledge graph.

6. The method as recited in claim 1, wherein the calculation of the vales of the state parameters is carried out at a plurality of points in time that are specified by a calculation frequency, the calculation frequency being provided by the first knowledge graph.

7. The method as recited in claim 1, wherein the determining of the operating state of the vehicle component includes the classifying of whether the operating state of the vehicle component is abnormal with the malfunction or is normal without the malfunction, based on the ascertained operating state of the vehicle component.

8. The method as recited in claim 7, wherein the classifying includes the calculating of the deviation between the calculated values of the selected one or more state parameters and the values of the selected one or more state parameters previously stored in the first knowledge graph.

9. The method as recited in claim 8, wherein the operating state of the vehicle component is classified as abnormal when the deviation exceeds or falls below a respective predefined value, the operating state of the vehicle component otherwise being classified as normal without the malfunction.

10. The method as recited in claim 8, wherein for each of the state parameters, the first knowledge graph contains the operating state indicator of the abnormal operating state of the vehicle component, as the result of which the plurality of operating state indicators is formed.

11. The method as recited in claim 10, wherein:

the operating state of the vehicle component is classified as abnormal when the deviation exceeds or falls below a respective predefined value, the operating state of the vehicle component otherwise being classified as normal without the malfunction; and each of the operating state indicators contains the deviation and the respective predefined value that corresponds to the respective state parameter of the vehicle component.

12. The method as recited in claim 7, wherein the calculating of the values of the selected one or more state parameters is performed at the certain points in time that are specified by the calculation frequency provided by the first knowledge graph, the method further comprising:

the updating, using the first knowledge graph, the one or more values of the calculation frequency in response to the classification result obtained from the classifying of the operating state of the vehicle component.

13. The method as recited in claim 12, wherein the updating, using the first knowledge graph, includes the first knowledge graph learning the one or more values of the calculation frequency based on the data instances stored in the first knowledge graph.

14. The method as recited in claim 7, further comprising:

the transmitting of the classified operating state of the vehicle component and the respective one or more of the values of the state parameters that resulted in the operating state of the vehicle component being determined as abnormal with the malfunction, to the second knowledge graph.

15. The method as recited in claim 14, wherein the transmitting of the respective one or more of the values of the state parameters takes place together with a corresponding one or more of operating state indicators of the abnormal operating state and/or with corresponding ones of of the signals.

16. The method as recited in claim 14, wherein the second knowledge graph includes transmitted state parameters of vehicle components of a plurality of vehicles pertaining to operating states that have been classified as abnormal with the malfunction, and the method further comprises updating a conceptual model of the second knowledge graph based on the transmitted state parameters of the vehicle components of the plurality of vehicles.

17. The method as recited in claim 16, wherein the updating of the conceptual model of the second knowledge graph includes using a statistical analysis with regard to the transmitted state parameters of the vehicle components of the plurality of vehicles to optimize the determining of the operating states of the vehicle components.

18. The method as recited in claim 16, further comprising:
updating the conceptual model of the first knowledge graph from the plurality of vehicles, based on the updated conceptual model of the second knowledge graph; and
transmitting update information, contained in the updated conceptual model of the second knowledge graph, to the first knowledge graph of each vehicle from the plurality of vehicles, including storing the transmitted update information in the first knowledge graph of each vehicle.

19. A system for a vehicle, the system configured to:
generate signals by a plurality of vehicle components of the system of the vehicle during operation of the vehicle and the vehicle components, wherein a first knowledge graph contains information concerning the plurality of vehicle components of the vehicle; and
determine an operating state of a vehicle component from the plurality of vehicle components, the determination including:
selecting, using the first knowledge graph, a plurality of signals from the signals provided by the vehicle components and selecting one or more state parameters that are necessary for determining the operating state of the vehicle component;
for each respective one of the one of more state parameters that have been selected, calculating a respective value of the respective state parameter based on the selected plurality of signals; and
ascertaining the operating state of the vehicle component based on the calculated values of the one or more state parameters;
wherein;
the system comprises:
a first electronic device for using the first knowledge graph; and
a second electronic device that is configured to:
monitor and receive the signals from the plurality of vehicle components of the vehicle; and
perform the calculating of the respective values of the respective state parameters of the plurality of vehicle components; and
the system includes at least one of the following features (I)-(II):

(I) the knowledge graph:
(i) includes: (a) a conceptual model that includes (1) a plurality of concepts, each of the concepts mapping a corresponding one of the vehicle components from the plurality of vehicle components, (2) attributes provided for the concepts, and (3) definitions of relationships of the plurality of concepts with one another; and (b) a plurality of data instances that include data points from the plurality of signals and/or from the respective values of the one or more state parameters, and that are associated with the respective concepts in the conceptual model; and
(ii) is configured to receive the selected signals and the values of the selected state parameters, and to transfer the received signals and the received state parameters into the conceptual model and/or into the data instances, thereby generating the data points of the plurality of data instances of the knowledge graph; and
(II) the system is further configured to classify whether the operating state of the vehicle component is abnormal with a malfunction or is normal without the malfunction, based on the ascertained operating state of the vehicle component, and the method further includes at least one of the following features (i)-(iii);
(i) (a) the classification includes calculating a deviation between the calculated values of the selected one or more state parameters and values of the selected one or more state parameters previously stored in the first knowledge graph, and (b) for each of the state parameters, the first knowledge graph contains an operating state indicator of the abnormal operating state of the vehicle component, as the result of which a plurality of operating state indicators is formed;
(ii) (a) the calculating of the values of the selected one or more state parameters is performed at certain points in time that are specified by a calculation frequency provided by the first knowledge graph and (b) the method further comprises updating, using the first knowledge graph, one or more values of the calculation frequency in response to a classification result obtained from the classifying of the operating state of the vehicle component; and
(iii) the system is further configured to transmit the classified operating state of the vehicle component and a respective one or more of the values of the state parameters that resulted in the operating state of the vehicle component being determined as abnormal with the malfunction, to a second knowledge graph.

20. A data cloud system configured to:
receive information from a second device of a system for a vehicle, the system for the vehicle being configured to:
generate signals by a plurality of vehicle components of the system of the vehicle during operation of the vehicle and the vehicle components, wherein a first knowledge graph that contains information concerning the plurality of vehicle components of the vehicle;

determine an operating state of a vehicle component from the plurality of vehicle components, the determination including:
- selecting, using the first knowledge graph, a plurality of signals from the signals provided by the vehicle components and selecting one or more state parameters that are necessary for determining the operating state of the vehicle component;
- for each respective one of the one of more state parameters that have been selected, calculating a respective value of the respective state parameter based on the selected plurality of signals; and
- ascertaining the operating state of the vehicle component based on the calculated values of the one or more state parameters; and classifying whether the operating state of the vehicle component is abnormal with a malfunction or is normal without the malfunction, based on the calculated operating state of the vehicle component;

wherein the system comprises:
- a first electronic device for using the first knowledge graph; and
- the second electronic device, the second electronic device being configured to:
  - monitor and receive the signals from the plurality of vehicle components of the vehicle; and
  - perform the calculating of the respective values of the respective state parameters of the plurality of vehicle components; and wherein the data cloud system is further configured to:
- transmit the classified operating state of the vehicle component and the respective one or more state parameters that resulted in the operating state of the vehicle component being determined as abnormal with the malfunction, to a second knowledge graph, wherein the second knowledge graph includes transmitted state parameters of vehicle components of a plurality of vehicles, the transmitted operating states having been classified as abnormal with a malfunction;
- update a conceptual model of the second knowledge graph based on the transmitted state parameters of the vehicle components of the plurality of vehicles; and
- transmit a piece of update information, contained in the updated conceptual model of the second knowledge graph, to the second device of each vehicle of the plurality of vehicles.

21. The method as recited in claim 1, wherein the selecting of at least one of (a) the plurality of signals and (b) the one or more state parameters is dependent, according to the first knowledge graph, upon a point in time within the operation of the vehicle.

* * * * *